(12) United States Patent
Yao (10) Patent No.: US 11,062,150 B2
(45) Date of Patent: Jul. 13, 2021

(54) PROCESSING METHOD AND APPARATUS FOR VEHICLE SCENE SEQUENCE TRACKING, AND VEHICLE

(71) Applicant: BAIDU ONLINE NETWORK TECHNOLOGY (BEIJING) CO., LTD., Beijing (CN)

(72) Inventor: Meng Yao, Beijing (CN)

(73) Assignee: BAIDU ONLINE NETWORK TECHNOLOGY (BEIJING) CO., LTD.

( * ) Notice: Subject to any disclaimer, the term of this patent is extended or adjusted under 35 U.S.C. 154(b) by 99 days.

(21) Appl. No.: 16/566,048

(22) Filed: Sep. 10, 2019

(65) Prior Publication Data

US 2020/0005052 A1   Jan. 2, 2020

(30) Foreign Application Priority Data

Dec. 29, 2018  (CN) .......................... 201811633876.4

(51) Int. Cl.
*G06K 9/00*      (2006.01)
*G06T 7/70*      (2017.01)
(Continued)

(52) U.S. Cl.
CPC ....... *G06K 9/00791* (2013.01); *G05D 1/0088* (2013.01); *G05D 1/0223* (2013.01);
(Continued)

(58) Field of Classification Search
CPC .. G06K 9/00791; G06K 9/00812; G06T 7/70; G06T 2207/30252; G06T 2207/10016;
(Continued)

(56) References Cited

U.S. PATENT DOCUMENTS

2003/0060972 A1*  3/2003  Kakinami ............ B62D 15/027
                                                             701/532
2009/0243889 A1   10/2009  Suhr et al.

FOREIGN PATENT DOCUMENTS

CN       102982559 A      3/2013
CN       103150547 A      6/2013
(Continued)

OTHER PUBLICATIONS

Hong, J., Zhang, X., Chen, J., Wei, Z., Cao. J., and Ren, Y. Analysis of Time- and Space-domain Sampling for Probe Vehicle-based Traffic Information System, 2007 IEEE Intelligent Transportation Systems Conference, Seattle, WA, 2007, pp. 836-841, doi: 10.1109/ITSC.2007.4357698. (Year: 2007).*

(Continued)

*Primary Examiner* — Nancy Bitar
*Assistant Examiner* — Daniella M. DiGuglielmo
(74) *Attorney, Agent, or Firm* — Dilworth IP, LLC (57) ABSTRACT

The embodiments of the present disclosure provide a processing method and apparatus for vehicle scene sequence tracking, and a vehicle. The method includes: obtaining a current vehicle speed of a vehicle driving in a first area and at least one frame of a current image taken; determining a vehicle speed ratio interval and a length of a sequence to be tracked according to the current vehicle speed; and performing the scene sequence tracking according to the vehicle speed ratio interval, the length of the sequence to be tracked, the at least one frame of the current image, and pre-stored multiple frames of historical reference images of the vehicle, to obtain position information of the vehicle. The method ensures that an accurate speed scanning range can still be quickly found when the vehicle speed changes greatly, and the speed scanning efficiency is greatly improved when the vehicle speed is relatively stable.

11 Claims, 5 Drawing Sheets

(51) Int. Cl.
  *G05D 1/00* (2006.01)
  *G05D 1/02* (2020.01)
  *G06T 7/20* (2017.01)
  *B60W 30/00* (2006.01)

(52) U.S. Cl.
  CPC ....... *G05D 1/0274* (2013.01); *G06K 9/00812* (2013.01); *G06T 7/20* (2013.01); *G06T 7/70* (2017.01); *B60W 30/00* (2013.01); *G05D 1/0246* (2013.01); *G05D 2201/0213* (2013.01); *G06T 2207/10016* (2013.01); *G06T 2207/30252* (2013.01)

(58) Field of Classification Search
  CPC ...... G06T 7/20; G05D 1/0088; G05D 1/0223; G05D 2201/0213; G05D 1/0274; G05D 1/0246; B60W 30/00
  USPC ........................................................ 382/104
  See application file for complete search history.

(56) References Cited

FOREIGN PATENT DOCUMENTS

| | | | | |
|---|---|---|---|---|
| CN | 106446824 A | | 2/2017 | |
| CN | 107644528 A | * | 1/2018 | |
| CN | 107644528 A | | 1/2018 | |
| CN | 108229475 A | | 6/2018 | |
| EP | 1288072 A2 | | 3/2003 | |
| EP | 1462762 A1 | * | 9/2004 | ............. G06T 15/20 |
| EP | 1462762 A1 | | 9/2004 | |
| EP | 2000977 A1 | * | 12/2008 | ......... G06K 9/00805 |
| JP | 2011186257 A | | 9/2011 | |
| WO | WO-2015086200 A1 | * | 6/2015 | ........... G06K 9/2027 |

OTHER PUBLICATIONS

Extended European Search Report, European Patent Application No. 19197092.0, dated Mar. 10, 2020, 10 pages.
Notice of Allowance in CN Patent Application No. 201811633876.4 dated Jan. 13, 2021.

* cited by examiner

PROCESSING METHOD AND APPARATUS FOR VEHICLE SCENE SEQUENCE TRACKING, AND VEHICLE

CROSS-REFERENCE TO RELATED APPLICATIONS

The present application claims priority to Chinese application No. 201811633876.4, filed on Dec. 29, 2018, which is incorporated by reference in its entirety.

TECHNICAL FIELD

The embodiments of the present disclosure relate to the field of autonomous driving technology, and in particular, to a processing method and apparatus for vehicle scene sequence tracking, and a vehicle.

BACKGROUND

In the field of intelligent driving, it may be necessary for the vehicle to implement self-positioning and automatic parking based on a scene sequence tracking algorithm in some scenarios. For example, in a place such as an underground garage or a parking lot, the position information of a vehicle can be determined based on a scene sequence tracking algorithm, and then the control on the driving of the vehicle can be performed according to the position information of the vehicle. Before using a scene sequence tracking algorithm, input parameters of the algorithm need to be obtained first.

In the prior art, the input parameters of a scene sequence tracking algorithm are mainly obtained based on experience, and the obtained input parameters are fixed values.

However, when the prior art approach is used, it can hardly adapt to vehicles running in different scenarios, resulting in low running efficiency and accuracy in some running scenarios.

SUMMARY

The embodiments of the present disclosure provide a processing method and apparatus for vehicle scene sequence tracking, and a vehicle, to solve the problem of low running efficiency and accuracy of the scene sequence tracking in the prior art.

A first aspect of the embodiments of the present disclosure provides a processing method for vehicle scene sequence tracking, including:

obtaining a current vehicle speed of a vehicle driving in a first area and at least one frame of a current image taken;

determining a vehicle speed ratio interval and a length of a sequence to be tracked according to the current vehicle speed, where the length of the sequence to be tracked is used to identify a number of frames of images used when performing scene sequence tracking; and performing the scene sequence tracking according to the vehicle speed ratio interval, the length of the sequence to be tracked, the at least one frame of the current image, and pre-stored multiple frames of historical reference images of the vehicle, to obtain position information of the vehicle in the first area.

Further, the determining a vehicle speed ratio interval according to the current vehicle speed includes:

obtaining a historical vehicle speed of the vehicle at a time when each of the historical reference images is taken, a time domain sampling rate corresponding to the current image, and a time domain sampling rate corresponding to the historical reference image, and determining a ratio of the current vehicle speed to the historical vehicle speed;

determining a scan width value according to the ratio of the current vehicle speed to the historical vehicle speed; and determining, according to the ratio of the current vehicle speed to the historical vehicle speed, and the scan width value, the vehicle speed ratio interval.

Further, the determining, according to the current vehicle speed, a length of a sequence to be tracked includes:

obtaining a historical vehicle speed of the vehicle at a time when each of the historical reference images is taken;

determining at least one length value according to the current vehicle speed and the historical vehicle speed; and taking a maximum of the at least one length value as the length of the sequence to be tracked.

Further, the performing the scene sequence tracking according to the vehicle speed ratio interval, the length of the sequence to be tracked, the at least one frame of the current image, and pre-stored multiple frames of historical reference images of the vehicle, to obtain position information of the vehicle in the first area includes:

taking the vehicle speed ratio interval, the length of the sequence to be tracked, the at least one frame of the current image, and the pre-stored multiple frames of the historical reference images of the vehicle as input parameters of a scene sequence tracking algorithm, to obtain the position information of the vehicle in the first area output by the scene sequence tracking algorithm.

Further, the method further includes:

adjusting a driving state of the vehicle according to the position information of the vehicle in the first area.

Further, the method further includes:

outputting prompt information corresponding to the position information according to the position information of the vehicle in the first area.

A second aspect of the embodiments of the present disclosure provides a processing apparatus for vehicle scene sequence tracking, including:

an obtaining module, configured to obtain a current vehicle speed of a vehicle driving in a first area and at least one frame of a current image taken;

a first determining module, configured to determine a vehicle speed ratio interval and a length of a sequence to be tracked according to the current vehicle speed, where the length of the sequence to be tracked is used to identify a number of frames of images used when performing scene sequence tracking; and a second determining module, configured to perform the scene sequence tracking according to the vehicle speed ratio interval, the length of the sequence to be tracked, the at least one frame of the current image, and pre-stored multiple frames of historical reference images of the vehicle, to obtain position information of the vehicle in the first area.

Further, the first determining module includes:

a first determining unit, configured to obtain a historical vehicle speed of the vehicle at a time when each of the historical reference images is taken, a time domain sampling rate corresponding to the current image, and a time domain sampling rate corresponding to the historical reference image, and determine a ratio of the current vehicle speed to the historical vehicle speed;

a second determining unit, configured to determine a scan width value according to the ratio of the current vehicle speed to the historical vehicle speed; and a third determining unit, configured to determine, according to the ratio of the current vehicle speed to the historical vehicle speed, and the scan width value, the vehicle speed ratio interval.

Further, the first determining module further includes:

an obtaining unit, configured to obtain a historical vehicle speed of the vehicle at a time when the historical reference image is taken;

a fourth determining unit, configured to determine at least one length value according to the current vehicle speed and the historical vehicle speed; and a fifth determining unit, configured to take a maximum of the at least one length value as the length of the sequence to be tracked.

Further, the second determining module is specifically configured to:

take the vehicle speed ratio interval, the length of the sequence to be tracked, the at least one frame of the current image, and the pre-stored multiple frames of the historical reference images of the vehicle as input parameters of a scene sequence tracking algorithm, to obtain the position information of the vehicle in the first area output by the scene sequence tracking algorithm.

Further, the apparatus further includes:

an adjusting module, configured to adjust a driving state of the vehicle according to the position information of the vehicle in the first area.

Further, the apparatus further includes:

an outputting module, configured to output prompt information corresponding to the position information according to the position information of the vehicle in the first area.

A third aspect of the embodiments of the present disclosure provides a vehicle, including:

a memory, configured to store program instructions;

a processor, configured to call and execute the program instructions in the memory to perform the method steps described in the first aspect above.

A fourth aspect of the embodiments of the present disclosure provides a readable storage medium having a computer program stored therein, where the computer program is used to perform the method described in the first aspect above.

The processing method and apparatus for vehicle scene sequence tracking and the vehicle provided by the embodiments of the present disclosure obtain a vehicle speed ratio interval and a length of a sequence to be tracked based on a current vehicle speed at which a vehicle is running, and perform scene sequence tracking based on the obtained vehicle speed ratio interval and the length of the sequence to be tracked to determine position information of the vehicle. Since the vehicle speed ratio interval and the length of the sequence to be tracked are obtained based on the current vehicle speed, the calculation parameters of the scene sequence tracking are dynamically adjusted by using the current vehicle speed of the vehicle, thereby being able to adapt to different running scenarios of the vehicle and ensuring that an accurate speed scanning range can still be quickly found when the vehicle speed changes greatly, and the speed scanning efficiency is greatly improved when the vehicle speed is relatively stable.

BRIEF DESCRIPTION OF THE DRAWINGS

In order to illustrate the technical solutions in the present disclosure or the prior art more clearly, the drawings required in the description of the embodiments or the prior art will be briefly described below. Obviously, the drawings in the following description are only some embodiments of the present disclosure, and other drawings can be obtained according to these drawings by those skilled in the art without inventive efforts.

DESCRIPTION OF EMBODIMENTS

In order to make the objectives, technical solutions, and advantages of the embodiments of the present disclosure more clear, the technical solutions in the embodiments of the present disclosure will be clearly and completely described in the following with reference to the accompanying drawings in the embodiments of the present disclosure. It is obvious that the described embodiments are only a part of the embodiments of the present disclosure, but not all embodiments. All other embodiments obtained by those skilled in the art based on the embodiments of the present disclosure without inventive efforts are within the scope of the present disclosure.

The terms "first", "second" and the like in the embodiments of the present disclosure and accompanying drawings are used to distinguish similar objects and not necessarily used to describe a specific order or an order of priority. It should be understood that the data so used is interchangeable where appropriate so that the embodiments of the present disclosure described herein can be implemented in an order other than those illustrated or described herein.

In the prior art, input parameters of a scene sequence tracking algorithm are mainly obtained based on experience, and the obtained input parameters are fixed values. These input parameters with fixed values have high running efficiency and accuracy only in some scenarios, but cannot adapt to different running scenarios of the vehicle. In an example, for the speed scanning range parameter, according to a preset vehicle speed ratio 1 (the reference vehicle speed is 3 m/s), the vehicle speed scanning range parameter in a scene tracking can be fixedly set to 0.8~1.2, that is, 2.4~3.6 m/s, in consideration of fluctuation of the vehicle speed. However, if the current vehicle driving environment is complicated and pulling over is included in the running process, the scanning range can then be fixedly adjusted to 0~1.2, that is, 0~3.6 m/s, in order to ensure the coverage ratio of the speed scanning range. Although the adjusted speed coverage is wider and can cope with complicated road conditions, however in most road sections, the vehicle still runs at a speed close to the speed in a reference video. Therefore, setting the excessive speed scanning range reduces the running efficiency and accuracy of the scene tracking. In another example, for the parameter, the length of the sequence to be tracked, a fixed value of 20 to 40 frames can be selected as the length of the sequence to be tracked. This approach of using a fixed threshold has the following problems. First, when the current vehicle speed changes greatly, the scene tracking algorithm still attempts to perform a local linear fitting with the fixed length of sequence to be tracked, resulting in the calculated motion trajectory failing to keep up with the position changes of the current vehicle. Secondly, when the scene changes greatly, the fixed length of sequence to be tracked cannot provide enough linear trajectory constraints, which reduces the robustness of the positioning algorithm to scene changes. Again, the fixed length of sequence to be tracked fixes the time domain sampling rate of the reference video sequence. When replacing with a reference video sequence of a different time domain sampling rate, it is necessary to manually re-adjust the length of sequence to be tracked appropriately, and the algorithm lacks adaptive capability. Therefore, the existing method is not able to adapt to vehicles running in different scenarios, resulting in lower running efficiency and accuracy in some running scenarios.

Based on the above problems, an embodiment of the present disclosure provides a processing method for vehicle scene sequence tracking, which obtains a vehicle speed ratio interval and a length of sequence to be tracked based on a current vehicle speed at which a vehicle is running, and performs scene sequence tracking based on the obtained vehicle speed ratio interval and the length of sequence to be tracked to determine position information of the vehicle. Since the vehicle speed ratio interval and the length of sequence to be tracked are obtained based on the current vehicle speed, the calculation parameters of the scene sequence tracking are dynamically adjusted by using the current vehicle speed of the vehicle, thereby being able to adapt to different running scenarios of the vehicle and ensuring that an accurate speed scanning range can still be quickly found when the vehicle speed changes greatly, and the speed scanning efficiency is greatly improved when the vehicle speed is relatively stable.

The processing method for vehicle scene sequence tracking provided by the embodiment of the present disclosure can be applied to scenarios such as vehicle self-positioning and automatic parking in places such as an underground garage, a parking lot, and the like. In these scenarios, regardless of the speed at which the vehicle is driving, it is possible to dynamically derive the vehicle speed ratio interval and the length of the sequence to be tracked that match the vehicle speed, to determine a precise position of the vehicle at the above places, for example, the vehicle is currently located at a certain parking space in an underground garage.

Figure 1:
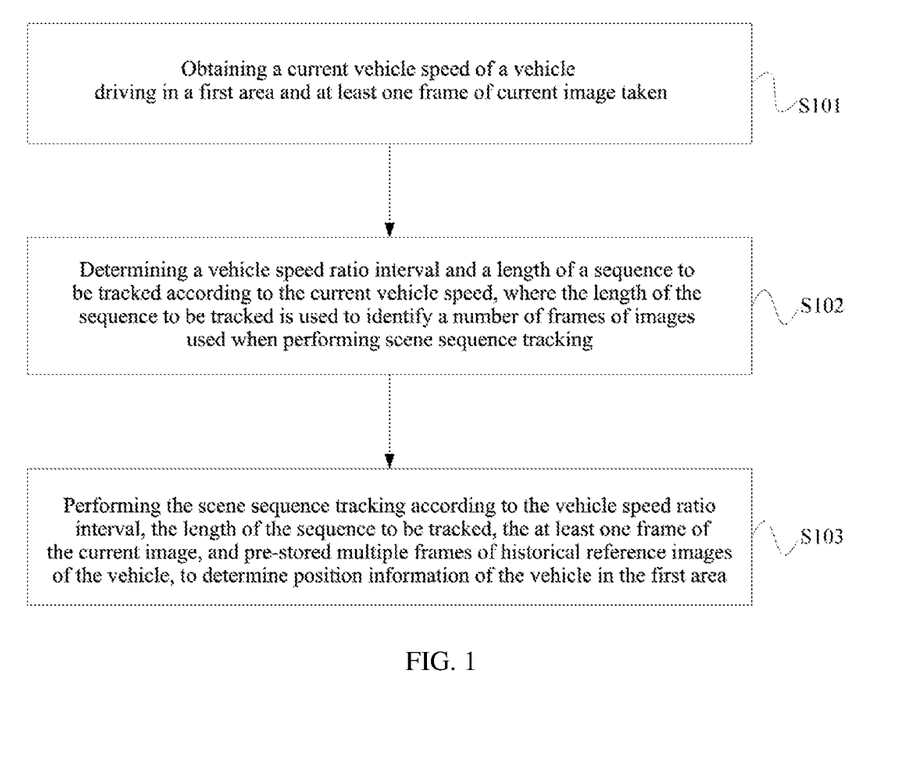
FIG. 1 is a schematic flowchart of Embodiment 1 of a processing method for vehicle scene sequence tracking according to an embodiment of the present disclosure.

FIG. 1 is a schematic flowchart of Embodiment 1 of a processing method for vehicle scene sequence tracking according to an embodiment of the present disclosure, where the execution subject of the method is a vehicle. As shown in FIG. 1, the method includes:

S101: Obtaining a current vehicle speed of a vehicle driving in a first area and at least one frame of a current image taken.

Optionally, the first area may be an area where the vehicle is currently driving, and the first area can be identified by map information on the vehicle. For example, based on the map information, the vehicle can determine that it has entered a parking lot A, which can be the first area described above. Further, the precise position of the vehicle when driving inside the parking lot A can be determined based on the following process.

Optionally, wheel speed information may be obtained according to a vehicle speedometer through a controller area network (CAN) bus of the vehicle, and then the current vehicle speed of the vehicle is obtained according to the wheel speed information.

The current vehicle speed is an instantaneous vehicle speed at which the vehicle is currently driving. In a specific implementation process, the vehicle can obtain the instantaneous vehicle speed of the vehicle and perform subsequent steps according to a certain smaller period, thereby continuously obtaining accurate position information of the vehicle in the first area.

Optionally, the at least one frame of the current image may be an image taken in real time at a current vehicle speed of the vehicle, i.e., within a current short time period, and the vehicle may use only one frame of the current image, or may use multiple frames of the current images for combination, and in combination with the other parameters described above, determine the position information of the vehicle in the first area.

S102: Determining a vehicle speed ratio interval and a length of a sequence to be tracked according to the current vehicle speed, where the length of the sequence to be tracked is used to identify a number of frames of images used when performing scene sequence tracking.

Optionally, the vehicle speed ratio interval is a ratio interval obtained by a ratio of the current vehicle speed to a historical vehicle speed when the vehicle drives in the first area before the current time, and the specific process will be described in detail in the following embodiments.

Exemplarily, assuming that the current vehicle speed is 3 m/s and the historical vehicle speed is also 3 m/s, then the ratio of the current vehicle speed to the historical vehicle speed is 1, and based on the ratio, the vehicle speed ratio interval can be obtained, for example, 0.8~1.2.

S103: Performing the scene sequence tracking according to the vehicle speed ratio interval, the length of the sequence to be tracked, the at least one frame of the current image, and pre-stored multiple frames of historical reference images of the vehicle, to determine position information of the vehicle in the first area.

Optionally, the multiple frames of the historical reference images are images taken when the vehicle drives in the first area before the current time. Optionally, after the vehicle drives in the first area for the first time and images are taken at various positions, the taken images can be preprocessed and marked to be used as historical reference images when the vehicle subsequently drives in the first area. Exemplarily, the vehicle takes 10 frames of images in the first area, where 2 frames of images are taken at the parking space A, then the vehicle can select one frame of image with better quality from the 2 frames of images, and mark the selected one frame of image as "Parking space A", and so on. In this way, historical reference images are obtained by selecting and marking the above-described 10 frames of images.

Exemplarily, the position information in the first area obtained through the above process may be, for example, a parking space, a roadblock, a fork, a charge gate, and the like.

In the embodiment, the vehicle speed ratio interval and the length of the sequence to be tracked are obtained based on the current vehicle speed when the vehicle is running, and scene sequence tracking is performed based on the obtained vehicle speed ratio interval and the length of the sequence to be tracked to determine position information of the vehicle. Since the vehicle speed ratio interval and the length of the sequence to be tracked are obtained based on the current vehicle speed, the calculation parameters of the scene sequence tracking are dynamically adjusted by using the current vehicle speed of the vehicle, thereby being able to adapt to different running scenarios of the vehicle and ensuring that an accurate speed scanning range can still be quickly found when the vehicle speed changes greatly, and the speed scanning efficiency is greatly improved when the vehicle speed is relatively stable.

On the basis of the above embodiment, the present embodiment relates to a process of determining the vehicle speed ratio interval based on the current vehicle speed of the vehicle.

Figure 2:
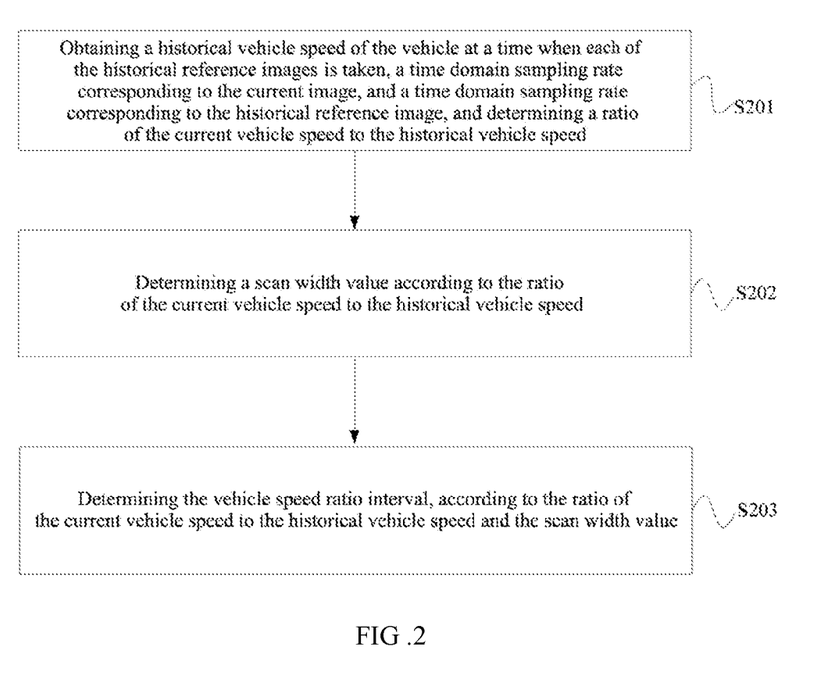
FIG. 2 is a schematic flowchart of Embodiment 2 of a processing method for vehicle scene sequence tracking according to an embodiment of the present disclosure.

FIG. 2 is a schematic flowchart of Embodiment 2 of a processing method for vehicle scene sequence tracking according to an embodiment of the present disclosure. As shown in FIG. 2, the process of determining the vehicle speed ratio interval based on the current vehicle speed of the vehicle may include:

S201: Obtaining a historical vehicle speed of the vehicle at a time when each of the historical reference images is taken, a time domain sampling rate corresponding to the current image, and a time domain sampling rate corresponding to the historical reference image, and determining a ratio of the current vehicle speed to the historical vehicle speed.

Optionally, the historical vehicle speed of the vehicle at the time when each of the historical reference images is taken may be obtained at that time and the historical vehicle speed can be stored. Further, in this step, the corresponding historical vehicle speed of the vehicle when each of the historical reference images is taken may be directly obtained.

Optionally, the ratio of the current vehicle speed to the historical vehicle speed may be calculated by the following formula (1):

$$k = f(v, s, vb, sb) \quad (1)$$

where k is the ratio of the current vehicle speed to the historical vehicle speed, v is the current vehicle speed, s is the time domain sampling rate corresponding to the current image, vb is the historical vehicle speed, sb is the time domain sampling rate corresponding to the historical reference image, and f is a ratio calculation function.

In this step, when calculating the ratio of the current vehicle speed to the historical vehicle speed, the current time domain sampling rate and historical time domain sampling rate are used as the parameters for calculating, so that the calculated ratio of the current vehicle speed to the historical vehicle speed is more accurate.

S202: Determining a scan width value according to the ratio of the current vehicle speed to the historical vehicle speed.

Optionally, the scan width value $\Delta k$ may be obtained according to k, for example, may be 0.2 times k.

Exemplarily, assuming that the vehicle speed ratio obtained in step S201 is 1, and $\Delta k$ is 0.2 times k, and thus $\Delta k$ is 0.2, it is known from the formula (2) below that the vehicle speed ratio interval $k_{range}$ is equal to (0.8, 1.2).

S203: Determining the vehicle speed ratio interval, according to the ratio of the current vehicle speed to the historical vehicle speed and the scan width value.

Optionally, the above-described vehicle speed ratio interval may be expressed by the following formula (2):

$$k_{range} = (k_{min}, k_{max}) = (k - \Delta k, k + \Delta k) \quad (2)$$

where $k_{range}$ is the above-mentioned vehicle speed ratio interval, $k_{min}$, $k_{max}$ are the minimum speed ratio and the maximum speed ratio of speed scanning, respectively, and $\Delta k$ is half of the scan width value, that is, half scan width.

On the basis of the above embodiment, the present embodiment relates to a process of determining the length of the sequence to be tracked according to the current vehicle speed.

Figure 3:
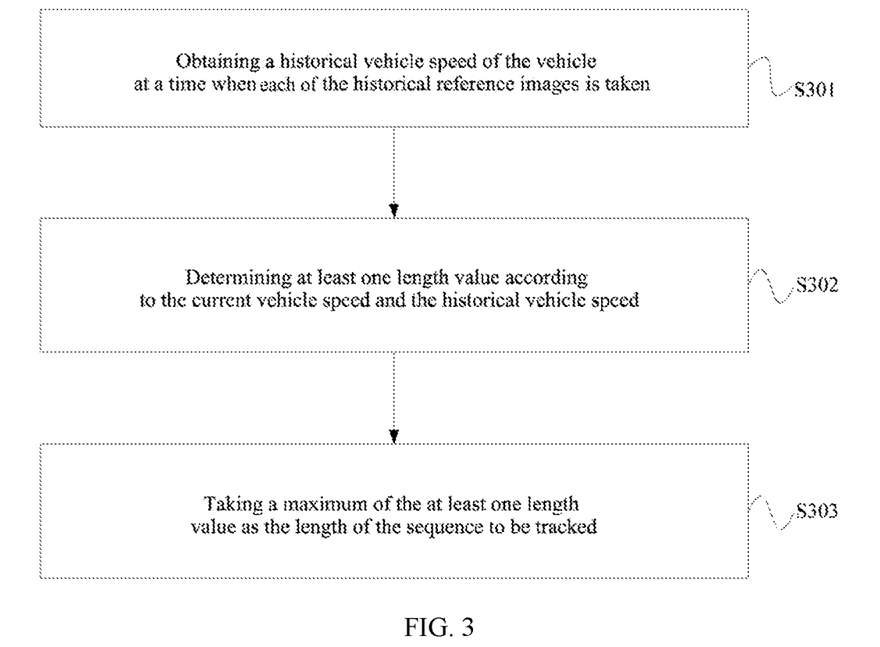
FIG. 3 is a schematic flowchart of Embodiment 3 of a processing method for vehicle scene sequence tracking according to an embodiment of the present disclosure.

FIG. 3 is a schematic flowchart of Embodiment 3 of a vehicle scene sequence tracking processing method according to an embodiment of the present disclosure. As shown in FIG. 3, the process of determining the length of the sequence to be tracked according to the current vehicle speed may include:

S301: Obtaining a historical vehicle speed of the vehicle at a time when each of the historical reference images is taken.

Optionally, the historical vehicle speed of the vehicle at the time when each of the historical reference images is taken may be obtained at that time and the historical vehicle speed can be stored. Further, in this step, the corresponding historical vehicle speed of the vehicle when each of the historical reference images is taken may be directly obtained.

S302: Determining at least one length value according to the current vehicle speed and the historical vehicle speed.

S303: Taking a maximum of the at least one length value as the length of the sequence to be tracked.

Optionally, the length of the sequence to be tracked is determined by the following formula (3):

$$L_{seq} = \underset{L}{\arg\max}\left(\frac{\partial^2 f(L, v, v_b)}{\partial v^2} = 0\right) \quad (3)$$

where L is the length value, v is the current vehicle speed, vb is the historical vehicle speed, and $L_{seq}$ is the length of the sequence to be tracked.

There is at least one L that satisfies the condition in the above formula, which means, there may be more, and the maximum value of the at least one L that satisfies the above condition is selected as the length of the sequence to be tracked.

In another embodiment, an alternative implementation of the foregoing step S103 is:

taking the vehicle speed ratio interval, the length of the sequence to be tracked, the at least one frame of the current image, and the pre-stored multiple frames of the historical reference images of the vehicle as input parameters of a scene sequence tracking algorithm, to obtain the position information of the vehicle in the first area output by the scene sequence tracking algorithm.

Optionally, the scene sequence tracking algorithm matches the current image and the historical reference image based on the foregoing vehicle speed ratio interval and the length of the sequence to be tracked to obtain a historical reference image with the highest matching degree with the current image, and further, according to mark information of the historical reference image with the highest matching degree, the position information corresponding to the current image is obtained, thereby determining the position information of the vehicle currently in the first area.

Exemplarily, the historical image with the highest matching degree with the current image is marked as a fork, it can then be determined that the vehicle is currently located at a fork.

On the basis of obtaining the position information of the vehicle in the first area through the above embodiment, further, the vehicle can be controlled based on the position information.

In an optional manner, a driving state of the vehicle may be adjusted according to the position information of the vehicle in the first area.

Adjusting the driving state of the vehicle may be, for example, reducing the vehicle speed, turning on the lights, switching directions, and the like.

Exemplarily, if it is determined by the foregoing process that the vehicle is located at a fork, the vehicle speed can be reduced to ensure driving safety of the vehicle.

In another alternative manner, prompt information corresponding to the location information may be output according to the position information of the vehicle in the first area.

Optionally, the prompt information corresponding to each position may be generated in advance. The prompt information may be to inform the user of the name of the position, or to remind the user to perform a corresponding operation.

In an example, the current position of the vehicle is a charge gate, and then the user may be reminded, by voice or text, to pay.

In another example, the current position of the vehicle is a roadblock, and then the vehicle can remind the user, by voice or text, about the presence of the roadblock and to pay attention to safety.

Figure 4:
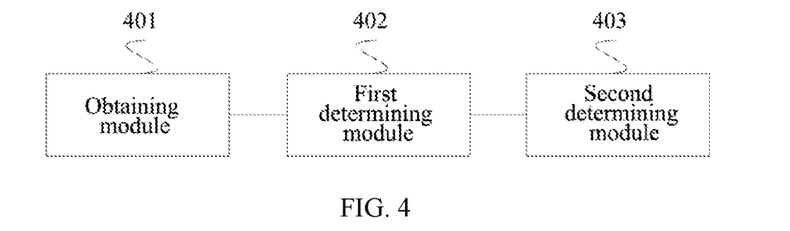
FIG. 4 is a module structure diagram of a processing apparatus for vehicle scene sequence tracking according to an embodiment of the present disclosure.

FIG. 4 is a module structure diagram of a processing apparatus for vehicle scene sequence tracking according to an embodiment of the present disclosure. As shown in FIG. 4, the apparatus includes:

an obtaining module 401, configured to obtain a current vehicle speed of a vehicle driving in a first area and at least one frame of a current image taken;

a first determining module 402, configured to determine a vehicle speed ratio interval and a length of a sequence to be tracked, according to the current vehicle speed, where the length of the sequence to be tracked is used to identify a number of frames of images used when performing scene sequence tracking; and a second determining module 403, configured to perform the scene sequence tracking according to the vehicle speed ratio interval, the length of the sequence to be tracked, the at least one frame of the current image, and pre-stored multiple frames of historical reference images of the vehicle, to obtain position information of the vehicle in the first area.

The apparatus is used to implement the foregoing method embodiment, and the implementation principle and technical effects are similar, and details are not described herein again.

Figure 5:
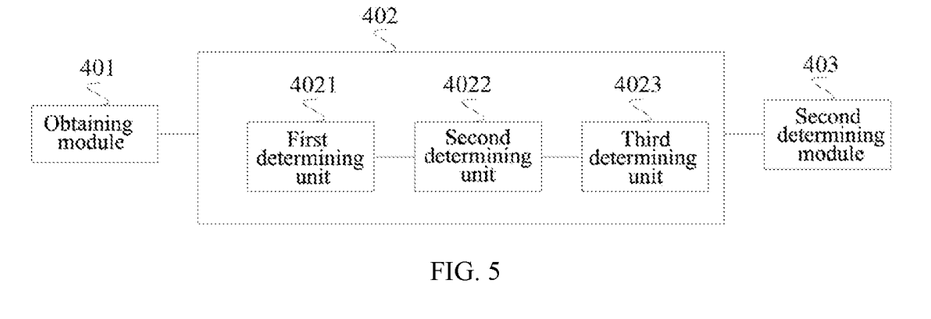
FIG. 5 is a module structure diagram of a processing apparatus for vehicle scene sequence tracking according to an embodiment of the present disclosure.

FIG. 5 is a module structure diagram of a processing apparatus for vehicle scene sequence tracking according to an embodiment of the present disclosure. As shown in FIG. 5, the first determining module 402 includes:

a first determining unit 4021, configured to obtain a historical vehicle speed of the vehicle at a time when each of the historical reference images is taken, a time domain sampling rate corresponding to the current image, and a time domain sampling rate corresponding to the historical reference image, and determine a ratio of the current vehicle speed to the historical vehicle speed;

a second determining unit 4022, configured to determine a scan width value according to the ratio of the current vehicle speed to the historical vehicle speed; and a third determining unit 4023, configured to determine, according to the ratio of the current vehicle speed to the historical vehicle speed, and the scan width value, the vehicle speed ratio interval.

Figure 6:
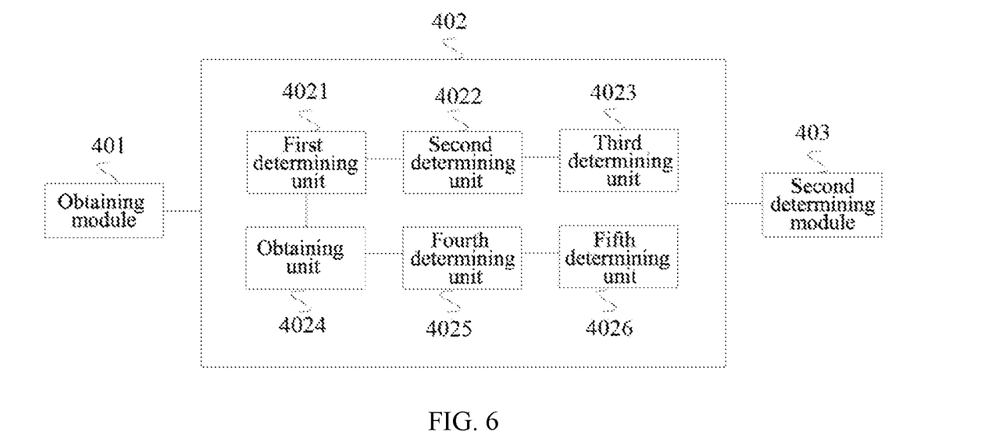
FIG. 6 is a module structure diagram of a processing apparatus for vehicle scene sequence tracking according to an embodiment of the present disclosure.

FIG. 6 is a module structure diagram of a processing apparatus for vehicle scene sequence tracking according to an embodiment of the present disclosure. As shown in FIG. 6, the first determining module 402 further includes:

an obtaining unit 4024, configured to obtain the historical vehicle speed of the vehicle at the time when each of the historical reference images is taken;

a fourth determining unit 4025, configured to determine at least one length value according to the current vehicle speed and the historical vehicle speed; and a fifth determining unit 4026, configured to take a maximum of the at least one length value as the length of the sequence to be tracked.

In another embodiment, the second determining module 403 is specifically configured to:

take the vehicle speed ratio interval, the length of the sequence to be tracked, the at least one frame of the current image, and the pre-stored multiple frames of the historical reference images of the vehicle as input parameters of a scene sequence tracking algorithm, to obtain the position information of the vehicle in the first area output by the scene sequence tracking algorithm.

Figure 7:
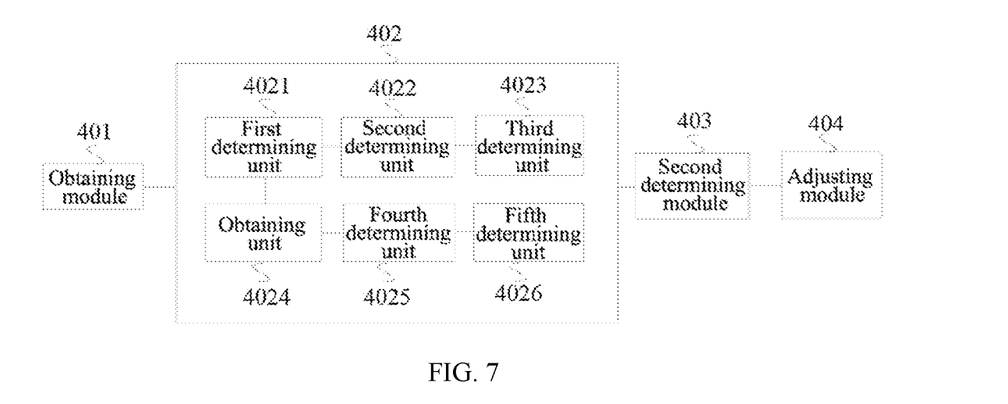
FIG. 7 is a module structure diagram of a processing apparatus for vehicle scene sequence tracking according to an embodiment of the present disclosure.

FIG. 7 is a module structure diagram of a processing apparatus for vehicle scene sequence tracking according to an embodiment of the present disclosure. As shown in FIG. 7, the apparatus further includes:

an adjusting module 404, configured to adjust a driving state of the vehicle according to the position information of the vehicle in the first area.

Figure 8:
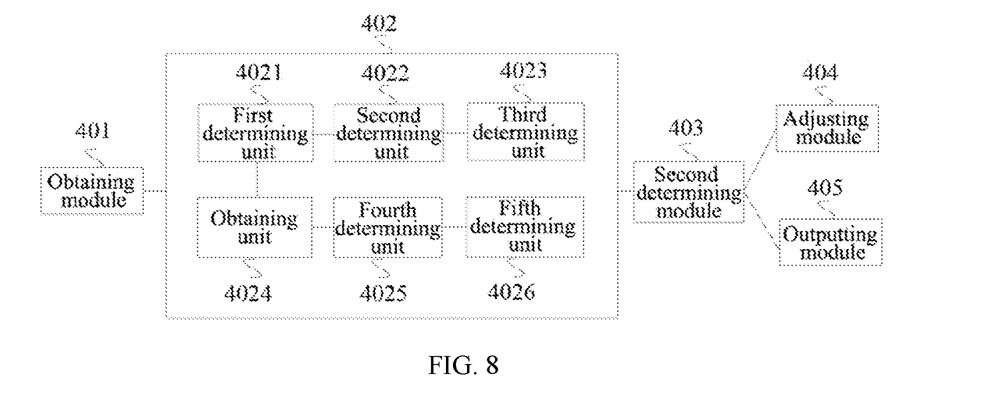
FIG. 8 is a module structure diagram of a processing apparatus for vehicle scene sequence tracking according to an embodiment of the present disclosure.

FIG. 8 is a module structure diagram of a processing apparatus for vehicle scene sequence tracking according to an embodiment of the present disclosure. As shown in FIG. 8, the apparatus further includes:

an outputting module 405, configured to output prompt information corresponding to the position information according to the position information of the vehicle in the first area.

Figure 9:
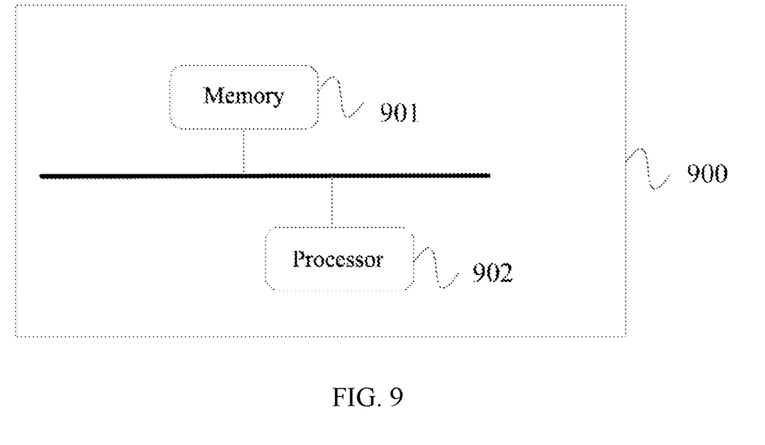
FIG. 9 is a physical block diagram of a vehicle according to an embodiment of the present disclosure.

FIG. 9 is a physical block diagram of a vehicle according to an embodiment of the present disclosure. As shown in FIG. 9, the vehicle 900 includes:

a memory 901, configured to store program instructions;

a processor 902, configured to call and execute the program instructions in the memory 901 to perform the method steps described in the method embodiment above.

Those skilled in the art will understand that all or part of the steps for implementing the various method embodiments described above may be accomplished by hardware related to program instructions. The aforementioned program may be stored in a computer readable storage medium. The program, when executed, performs the steps of the foregoing method embodiments; and the foregoing storage medium includes various media that can store program codes, such as a ROM, a RAM, a magnetic disk, or an optical disk.

Finally, it should be noted that the above embodiments are merely used to illustrate the technical solutions of the present disclosure, rather than limiting them. Although the present disclosure has been described in detail with reference to the foregoing embodiments, those skilled in the art should understand that the technical solutions described in the foregoing embodiments may be modified, or some or all of the technical features may be equivalently substituted; and the modifications or substitutions do not deviate the essence of the corresponding technical solutions from the scope of the technical solutions of the embodiments of the present disclosure.

What is claimed is:

1. A processing method for vehicle scene sequence tracking, comprising:
    obtaining a current vehicle speed of a vehicle driving in a first area and at least one frame of a current image taken;
    determining, according to the current vehicle speed, a vehicle speed ratio interval and a length of a sequence to be tracked, wherein the length of a sequence to be tracked is used to identify a number of frames of images used when performing scene sequence tracking; and
    performing the scene sequence tracking according to the vehicle speed ratio interval, the length of the sequence to be tracked, the at least one frame of the current image, and pre-stored multiple frames of historical reference images of the vehicle, to obtain position information of the vehicle in the first area;
    wherein the determining, according to the current vehicle speed, a length of a sequence to be tracked comprises:
    obtaining a historical vehicle speed of the vehicle at a time when each of the historical reference images is taken;
    determining at least one length value according to the current vehicle speed and the historical vehicle speed; and
    taking a maximum of the at least one length value as the length of the sequence to be tracked.

2. The method according to claim 1, wherein the determining, according to the current vehicle speed, a vehicle speed ratio interval comprises:
    obtaining a historical vehicle speed of the vehicle at a time when each of the historical reference images is taken, a time domain sampling rate corresponding to the current image, and a time domain sampling rate corresponding to the historical reference image, and determining a ratio of the current vehicle speed to the historical vehicle speed;
    determining a scan width value according to the ratio of the current vehicle speed to the historical vehicle speed; and
    determining, according to the ratio of the current vehicle speed to the historical vehicle speed, and the scan width value, the vehicle speed ratio interval.

3. The method according to claim 1, wherein the performing the scene sequence tracking according to the vehicle speed ratio interval, the length of the sequence to be tracked, the at least one frame of the current image, and pre-stored multiple frames of historical reference images of the vehicle, to obtain position information of the vehicle in the first area comprises:
    taking the vehicle speed ratio interval, the length of the sequence to be tracked, the at least one frame of the current image, and the pre-stored multiple frames of the historical reference images of the vehicle as input parameters of a scene sequence tracking algorithm, to obtain the position information of the vehicle in the first area output by the scene sequence tracking algorithm.

4. The method according to claim 1, wherein the method further comprises:
    adjusting a driving state of the vehicle according to the position information of the vehicle in the first area.

5. The method according to claim 1, wherein the method further comprises:
    outputting prompt information corresponding to the position information according to the position information of the vehicle in the first area.

6. A processing apparatus for vehicle scene sequence tracking, comprising:
    a memory, configured to store program instructions;
    a processor, configured to call and execute the program instructions in the memory to:
    obtain a current vehicle speed of a vehicle driving in a first area and at least one frame of a current image taken;
    determine, according to the current vehicle speed, a vehicle speed ratio interval and a length of a sequence to be tracked, wherein the length of the sequence to be tracked is used to identify a number of frames of images used when performing scene sequence tracking; and
    perform the scene sequence tracking according to the vehicle speed ratio interval, the length of the sequence to be tracked, the at least one frame of the current image, and pre-stored multiple frames of historical reference images of the vehicle, to obtain position information of the vehicle in the first area;
    wherein the processor calls and executes the program instructions in the memory further to:
    obtain a historical vehicle speed of the vehicle at a time when the historical reference image is taken;
    determine at least one length value according to the current vehicle speed and the historical vehicle speed; and
    take a maximum of the at least one length value as the length of the sequence to be tracked.

7. The apparatus according to claim 6, wherein the processor calls and executes the program instructions in the memory further to:
    obtain a historical vehicle speed of the vehicle at a time when each of the historical reference images is taken, a time domain sampling rate corresponding to the current image, and a time domain sampling rate corresponding to the historical reference image, and determine a ratio of the current vehicle speed to the historical vehicle speed;
    determine a scan width value according to the ratio of the current vehicle speed to the historical vehicle speed; and
    determine, according to the ratio of the current vehicle speed to the historical vehicle speed, and the scan width value, the vehicle speed ratio interval.

8. The apparatus according to claim 6, wherein the processor calls and executes the program instructions in the memory further to:
    take the vehicle speed ratio interval, the length of the sequence to be tracked, the at least one frame of the current image, and the pre-stored multiple frames of the historical reference images of the vehicle as input parameters of a scene sequence tracking algorithm, to obtain the position information of the vehicle in the first area output by the scene sequence tracking algorithm.

9. The apparatus according to claim 6, wherein the processor calls and executes the program instructions in the memory further to:
    adjust a driving state of the vehicle according to the position information of the vehicle in the first area.

10. The apparatus according to claim 6, wherein the processor calls and executes the program instructions in the memory further to:

output prompt information corresponding to the position information according to the position information of the vehicle in the first area.

11. A non-transitory readable storage medium having a computer program stored therein, wherein the computer program is used to perform the method of claim 1.

* * * * *